Sept. 7, 1965   E. A. ROTH   3,204,677
FRUIT AND VEGETABLE PEELING METHOD
Filed July 17, 1962   2 Sheets-Sheet 1
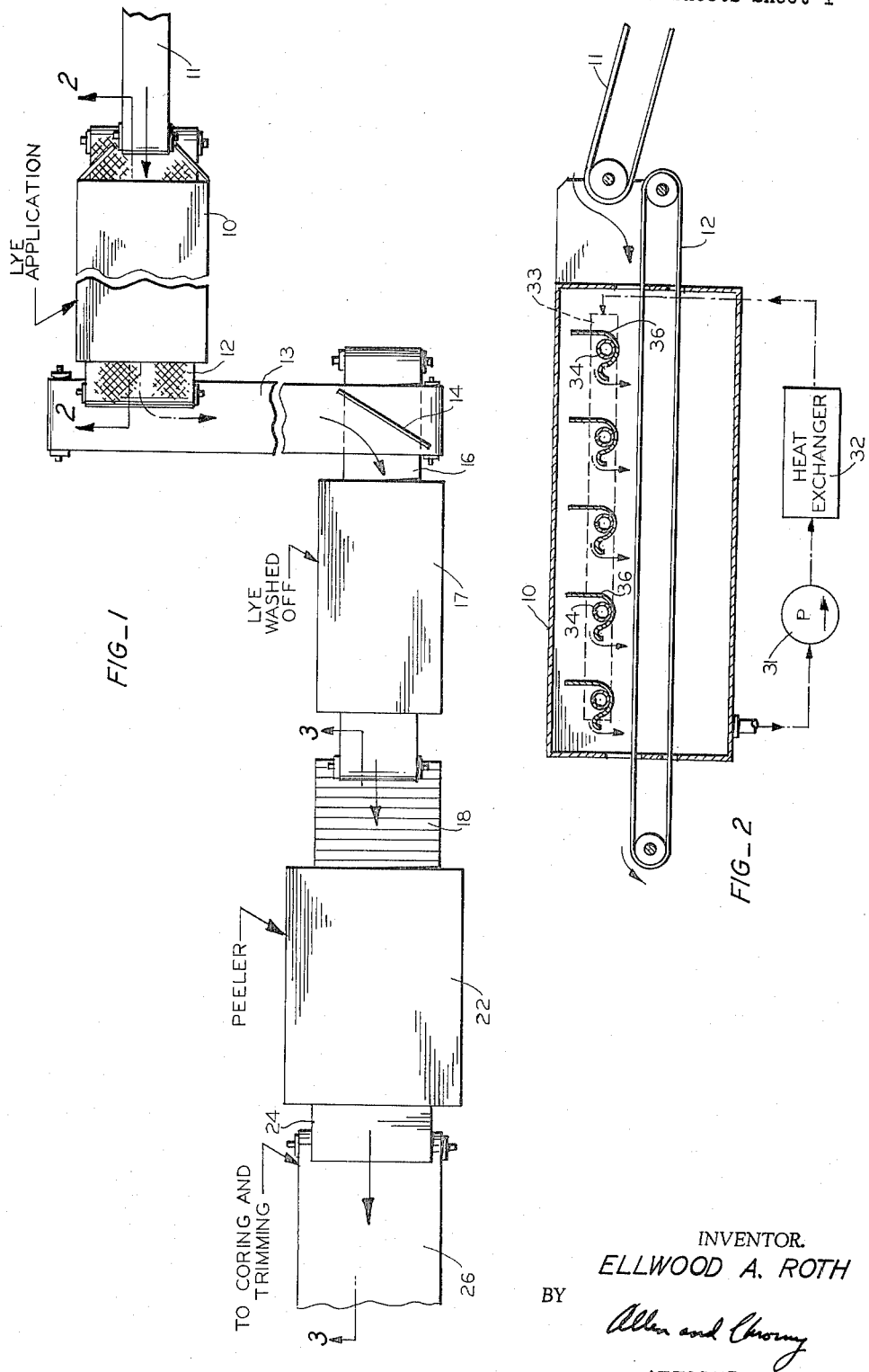
INVENTOR.
ELLWOOD A. ROTH
BY
Allen and Chromy
ATTORNEYS Sept. 7, 1965  E. A. ROTH  3,204,677
FRUIT AND VEGETABLE PEELING METHOD
Filed July 17, 1962  2 Sheets-Sheet 2
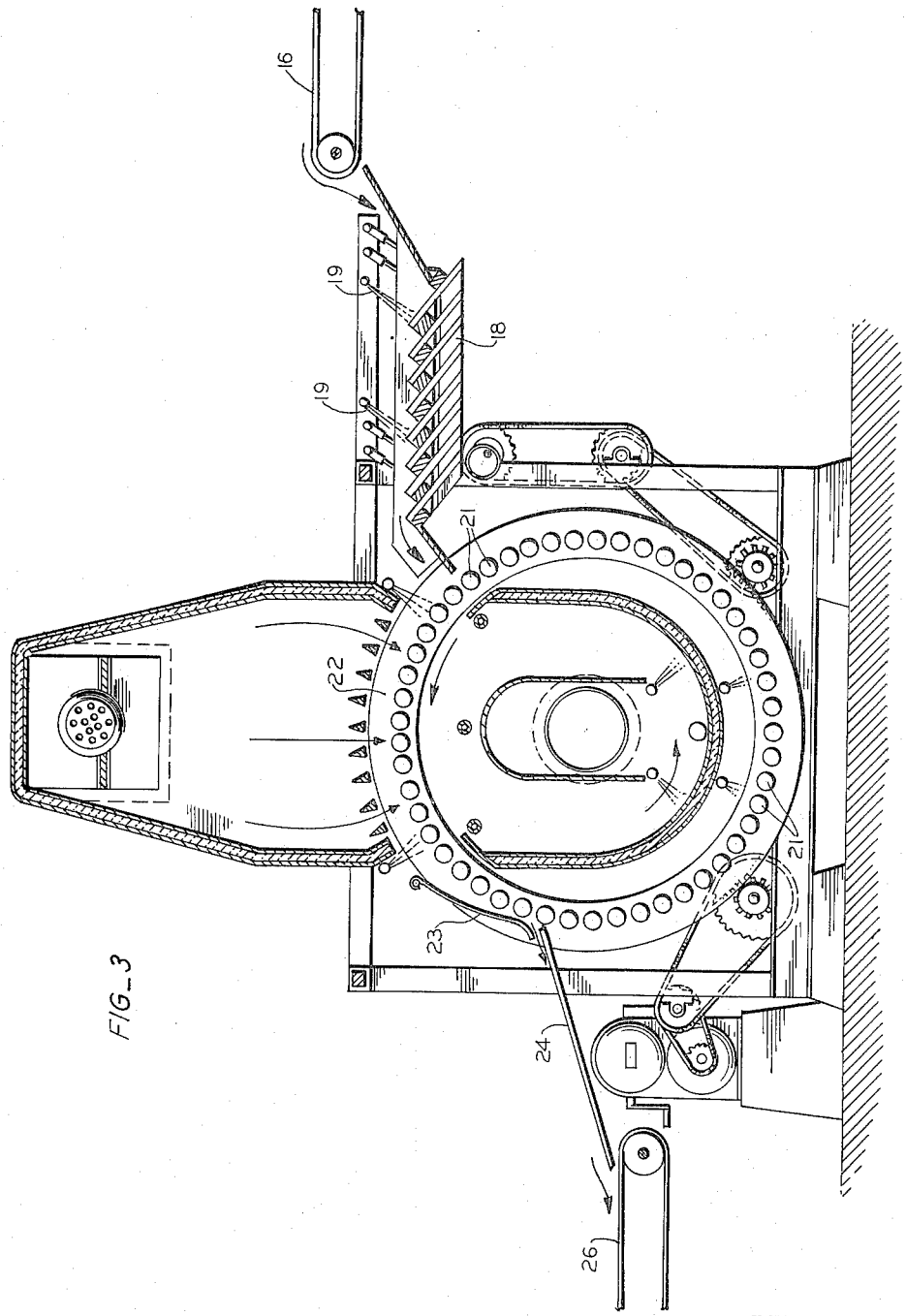
INVENTOR.
ELLWOOD A. ROTH
BY
ATTORNEYS United States Patent Office 3,204,677
Patented Sept. 7, 1965

3,204,677
FRUIT AND VEGETABLE PEELING METHOD
Ellwood A. Roth, San Jose, Calif., assignor of one-half to Genevieve I. Magnuson and one-half to Genevieve I. Magnuson, Robert Magnuson, and Lois J. Fox, as trustees of the estate of Roy M. Magnuson
Filed July 17, 1962, Ser. No. 210,332
2 Claims. (Cl. 146—234)

The present invention relates to peeling of fruit and vegetable articles, and is concerned more particularly with a peeling method and a peeling apparatus which result in effective peeling of a high percentage of articles processed, with a minimum of adjustment and alteration of operation in apparatus and method to adjust to field varieties during the peeling process.

It is a general object of the invention to provide improved means and methods for peeling fruit and vegetable articles.

It is a general object of the invention to provide improved means and methods of the above character which is particularly effective with tomatoes.

Another object of the invention is to provide an improved method and apparatus for peeling of fruit and vegetable articles where approximately the entire capacity of the apparatus in flow of articles can be utilized with effective peeling.

Another object of the invention is to provide methods and apparatus of the above character attaining the foregoing objects and in which in the case of the tomatoes a very thin peel is removed so as to produce a firm highly colored tomato on which there remains the delicate outer pectin layers retaining the surface color and food value of the product.

Other objects and advantages of the invention will be apparent from the following description of certain preferred embodiments thereof, and a preferred manner of carrying out the method, as illustrated in the accompanying drawings, in which:

FIG. 1 is a schematic plan view of the apparatus;

FIG. 2 is a schematic sectional view taken in a plane indicated by the line 2—2 in FIG. 1;

FIG. 3 is a schematic sectional view taken in a plane indicated by the line 3—3 in FIG. 1.

It has been common practice in the past to peel tomatoes by subjecting them to a treatment with a caustic agent such as lye, and then washing off peel which has been disintegrated by the lye treament. This lye peeling process has been complicated by the fact that the tomatoes are hand cored after being subjected to lye and before peel removal and this is a difficult and costly operation. The heavy washing required to remove the skin from lye-peeled tomatoes cuts down yield and also carries some lye into the tomatoes through the core holes. It has also been common practice in the past to remove the peel from the tomatoes by a high temperature high velocity oxygen-free gaseous peeling medium for example as disclosed and described in the Magnuson Patents Nos. 2,910,392 dated Oct. 27, 1959, and 2,977,085 dated Aug. 22, 1961. In this high velocity high temperature medium type peeling difficulty has been encountered due to the necessity of adjusting the temperature and velocity conditions in the peeling machine as different grades of tomatoes are processed from day to day during the tomato canning season. In some instances, it has been impossible to use the full capacity of the machine in processing due to the character of the tomatoes being processed so that the processing rate or volume will vary from time to time during the processing operation.

I have discovered that by combining the desirable portions of these two separate peeling processes that I can obtain outstanding results in the peeling of fruits and vegetable articles, for example, tomatoes. In the case of tomatoes it is possible to produce a firm highly colored tomato and to save the delicate outer pectin layers which retain the surface color and food value of the product with substantially all types or grades of tomatoes grown during the growing season and to operate the equipment and apparatus at substantially its maximum capacity at all times.

While the method and apparatus is useful in connection with other products than tomatoes, its operation will be described in connection with the peeling of tomatoes with which it is particularly useful.

Referring to FIG. 1, the apparatus includes a lye application tank 10 having a conveyor 12 of the wire mesh type to which indiscriminately arranged whole firm tomatoes are fed from a conveyor 11. From the conveyor 12 of the lye application means 10 the tomatoes are discharged unto a transverse conveyor 13 which has a discharge baffle 14 to direct tomatoes therefrom to a conveyor 16. The conveyor 16 passes through a washing tank 17 and discharges onto a shuffle feed mechanism 18 which is of the character disclosed in the patent to Magnuson No. 2,792,929 dated May 21, 1957. As seen in FIG. 3 for example, this shuffle feed conveyor 18 may have associated therewith a plurality of washing sprays 19 in addition to the washing tank 17. If desired, the entire washing can be done on the shuffle feed mechanism 18.

From the shuffle feed mechanism 18 (FIGS. 1 and 3), the fruit or vegetable articles such as tomatoes are deposited on the rollers 21 of a rotary conveyor which pass through a treating chamber 22 of the character disclosed in the Magnuson Patents No. 2,977,085 and No. 2,910,392 where they are subjected to a high velocity high temperature gaseous oxygen-free-peeling medium to remove the skins previously weakened by the lye treatment. From the conveyor rollers 21 the fruit or vegetable articles are discharged under a retaining gate 23 onto a discharge ramp 24 leading to a discharge conveyor 26, which may lead to conventional operations such as coring and trimming.

Referring to the caustic treating step for the fruit or vegetable articles, the caustic solution which may comprise lye and a suitable wetting agent, is recirculated through a closed system including a pump 31 fed by drainage from the lye application tank 10, and discharging through a heat exchanger 32 by means of which the temperature is maintained at a suitable elevation of about 190 to 205 degrees F. The lye solution is led from the heat exchanger to a distributor or header 33 which communicates through perforated pipes 34 extending transversely therefrom with a series of troughs 36 which overflow to provide a series of cascades of lye to treat the product on the conveyor 12. The conveyor 12 may be of conventional wire mesh form or it may comprise a series of rollers which are rotated while passing through the tank so as to insure coating of the entire surface of tomatoes. Alternatively, the conveyor 12 may be provided in a separate stretch with a hump at an intermediate portion which will cause rolling over of the tomatoes as it passes thereover.

After the application of the lye in the lye tank 10, the tomatoes are provided with a lye reaction period while traveling over the conveyor 13 of from about 50 seconds to about 80 seconds, although this period is not critical. The lye solution has a strength of 12–20% by weight and can be varied in accordance with the difficulty of peeling any particular lot of tomatoes and it is at this point that the adjustment of the apparatus to the particular type of tomato being processed is made.

The tomatoes are thereafter subjected to a high velocity hot gaseous peeling medium of the character generally described in the patent to Roy M. Magnuson No.

2,910,392 issued October 27, 1959. In accordance with this process, the heating medium is prepared by burning a fuel to substantially complete combustion and with a minimum amount of excess oxygen over and above the amount necessary for such complete combustion. The hot gaseous flame-free treating atmosphere thus produced has imparted thereto a velocity sufficient to provide for peel separation or peel removal. This medium is preferably applied in a substantially enclosed treating chamber and the first effect of the hot treating medium on tomatoes is to effect blistering of the skin and skin cracking. Immediately upon cracking or blistering of the skin, the hot gaseous treating medium moving at a velocity of 60 to 75 m.p.h. contacts the skin and removes it from the tomato. The temperature of the treating medium may be of the order of 650 to 700 degrees and the pressure of the chamber through which the medium is passed before it enters the treating chamber is from 6 to 12 inches of water and the time in passing through the treating chamber may be varied from 6 to 12 seconds.

After the skin removal step, the tomatoes are passed under water sprays to cool them and to wash away the loose bits of peel. Subsequently, the tomatoes may be cored or processed as may be required in accordance with the canning process to which they are to be subjected.

The advantages of the above combined process provides substantially complete peeling of all the tomatoes irrespective of the skin condition of the tomatoes as the process can be adjusted by controlling the concentration of lye to fit the particular skin condition.

It is important to supply firm whole tomatoes, without broken skin, so that they can be handled indiscriminately positioned during the lye treatment and no lye will get inside the tomatoes. The time of treatment or reaction time with the lye is enough to partially destroy the skin without penetrating it and also to remove any fruit waxes which frequently coat tomatoes. This results in the skin which can be thoroughly wetted and with all the waxes removed so that the heating action of the gaseous peeling medium can be very complete and a complete peeling operation can take place. In this process, the peel is removed by the wind action of the treating medium and not by subsequent washing.

While I have shown and described a preferred embodiment of the invention, and a preferred method of carrying out the invention, it will be apparent that the invention is capable of variation and modification from the form shown so that the scope thereof should be limited only by the proper scope of the claims appended hereto.

What I claim is:

1. The method of peeling fruit and vegetable articles which comprises subjecting whole articles to a lye solution for a sufficient time to break down the tissues of the skin without penetrating entirely through the skin, washing the articles to remove all of the lye solution, circulating a hot gaseous treating medium through a path including a treating zone to provide a velocity of the medium of at least 60 to 75 m.p.h. through the treating zone, and passing a group of indiscriminately positioned articles through the treating zone to subject them to the high velocity gaseous medium and to effect blistering of the skin of the articles and to remove substantially all of the skin upon blistering without damaging the flesh of the articles.

2. The method of removing a thin wax-like outer skin layer of tomatoes while leaving the adjacent gelatinous layer on the body of the tomatoes, which comprises subjecting whole tomatoes to a lye solution of from 10 to 20% by weight for a period of from about 50 to about 80 seconds, then washing the articles to remove the lye solution therefrom, and then subjecting the articles to a hot gaseous flame-free treating medium having a velocity of at least 60 to 75 m.p.h. to effect separation of the skin from the body of the tomato and to effect removal thereof.

References Cited by the Examiner
UNITED STATES PATENTS

| | | | |
|---|---|---|---|
| 1,427,270 | 8/22 | Dunkley | 146—47 X |
| 2,822,842 | 2/58 | Morici | 146—47 |
| 2,910,392 | 10/59 | Magnuson | 146—241 |
| 2,910,393 | 10/59 | Magnuson | 146—241 |
| 2,985,210 | 5/61 | Magnuson | 146—46 |
| 2,997,085 | 8/61 | Magnuson | 146—47 |
| 3,115,176 | 12/63 | Walker | 146—47 X |

J. SPENCER OVERHOLSER, *Primary Examiner.*